(12) United States Patent
Bernstein et al.

(10) Patent No.: US 8,738,724 B2
(45) Date of Patent: May 27, 2014

(54) TOTALLY ORDERED LOG ON APPENDABLE STORAGE

(75) Inventors: Philip A. Bernstein, Bellevue, WA (US);
Dahlia Malkhi, Palo Alto, CA (US);
Colin Wilson Reid, Redmond, WA (US);
Mahesh Balakrishnan, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 12/786,447

(22) Filed: May 25, 2010

(65) Prior Publication Data
US 2011/0295969 A1 Dec. 1, 2011

(51) Int. Cl.
*G06F 15/167* (2006.01)

(52) U.S. Cl.
USPC .......................... 709/213; 709/212; 709/217

(58) Field of Classification Search
None
See application file for complete search history.

(56) References Cited

U.S. PATENT DOCUMENTS

| | | | |
|---|---|---|---|
| 5,974,503 A | 10/1999 | Venkatesh et al. | |
| 6,202,067 B1 | 3/2001 | Blood et al. | |
| 6,912,668 B1 | 6/2005 | Brown et al. | |
| 7,249,280 B2 | 7/2007 | Lamport et al. | |
| 7,281,032 B2 | 10/2007 | Kodama | |
| 7,475,207 B2 | 1/2009 | Bromling et al. | |
| 7,558,883 B1 | 7/2009 | Lamport | |
| 7,769,723 B2 * | 8/2010 | Zheng et al. | 707/682 |
| 2002/0156987 A1 | 10/2002 | Gajjar et al. | |
| 2002/0161850 A1 * | 10/2002 | Ulrich et al. | 709/214 |
| 2005/0036793 A1 * | 2/2005 | Endo | 399/10 |
| 2009/0150566 A1 | 6/2009 | Malkhi et al. | |
| 2010/0180085 A1 * | 7/2010 | Dave et al. | 711/146 |

OTHER PUBLICATIONS

Chockler, et al., "Active Disk Paxos", Retrieved at << http://citeseerx.ist.psu.edu/viewdoc/download?doi=10.1.1.8.2232&rep=rep1&type=pdf >>, In the 21st ACM Symposium on Principles of Distributed Computing (PODC '02), Aug. 2002, pp. 10.

Hildebrand, et al., "Exporting Storage Systems in a Scalable Manner with pNFS", Retrieved at << http://storageconference.net/2005/papers/02_hildebrandd_exporting.pdf >>, MSST, Proceedings of the 22nd IEEE / 13th NASA Goddard Conference on Mass Storage Systems and Technologies, Apr. 11-14, 2005, pp. 5.

Amiri, et al., "Scalable Concurrency Control and Recovery for Shared Storage Arrays", Retrieved at http://citeseerx.ist.psu.edu/viewdoc/download?doi=10.1.1.39.5664&rep=rep1&type=pdf >>, Technical Report CMU-CS-99-111, Feb. 1999, pp. 26.

* cited by examiner

*Primary Examiner* — Mohamed Ibrahim
(74) *Attorney, Agent, or Firm* — Micah Goldsmith; Glen Johnson; Micky Minhas

(57) ABSTRACT

Computers are provided with a totally ordered, durable shared log. Shared storage is used and can be directly accessed by the computers over a network. Append-log operations are made atomic in the face of failures by committing provisional append ordering information onto a log. The log may comprise multiple flash packages or non-volatile memory devices, referred to as segments, although any shared storage device(s) may be used. Each log record is a multi-page stripe, where each page of a stripe is written to a different segment. Fault-tolerant protocol variants append stripes to the log, such that stripes are totally ordered in the log and each stripe is written atomically.

20 Claims, 10 Drawing Sheets

TOTALLY ORDERED LOG ON APPENDABLE STORAGE

BACKGROUND

Computer data storage refers to components, devices, and/or recording media used to retain digital data for periods of time. Various types of computer data storage exist, including memory devices (e.g., semiconductor storage), such as random access memory (RAM) devices and read only memory (ROM) devices, and mass storage devices, such as optical discs and magnetic storage (hard disks, magnetic tapes, etc.), and further types of storage.

A particular computer data storage implementation may be associated with a single computer or may be shared by multiple computers. For instance, a computer system that includes multiple computers may share a large persistent data store (e.g., a logical service) that is accessible over a storage network. The persistent data store may include a large number of independent storage units, including an array of hard disk drives and/or flash memory devices or other types of computer data storage. Data may be stored in the data store in various ways. For instance, in one current technique for storing data, multipage units of data may be stored in a data store in the form of "stripes." A set of storage units that is used to store data stripes may be referred to as a "stripeset." Stripesets that store data in the form of stripes enable relatively high performance and high availability of access to stored data.

Allowing multiple computers to independently write stripes to a stripeset can be difficult to manage, however. For example, total ordering and consistency are difficult to guarantee.

SUMMARY

Shared storage is used and can be directly accessed by the computers over a network. A convenient arrangement for shared storage is in the form of a totally-ordered, append-able log. Append-log operations are made atomic in the face of failures by committing provisional append ordering information onto a log. The log may comprise multiple flash packages or non-volatile memory devices, referred to as segments, although any shared storage device(s) may be used. Each log record is a multi-page stripe, where each page of a stripe is written to a different segment. Fault-tolerant protocol variants append stripes to the log, such that stripes are totally ordered in the log and each stripe is written atomically.

In an implementation, a reliable, persistent ordered log over an array of network-attached storage devices is provided. The log provides computers with the ability to append multi-page stripes and to read those stripes by directly accessing the storage devices over a network. Appended stripes are totally ordered, and append and read operations are reliable and provide strict atomicity guarantees.

In an implementation, a method for sharing a data store among multiple computers comprises setting a provisional append order for a log comprised within the data store, and committing log entries associated with the provisional append order to a total order of the log. The log entries may comprise data stripes that are totally ordered. The data stripes may be appended in the log such that the data stripes are totally ordered in the log, and the data stripes may be written atomically to the log. The log may comprise a plurality of flash memory devices, and each log entry is a multi-page stripe, and each page of a stripe is written to a different one of the flash memory devices.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

A shared storage system is based on appending data to a storage device to allow computers to access storage. In some embodiments, the shared storage system is implemented in a storage controller device that sits between one or more storage devices and one or more computers that store data using the system.

Figure 1:
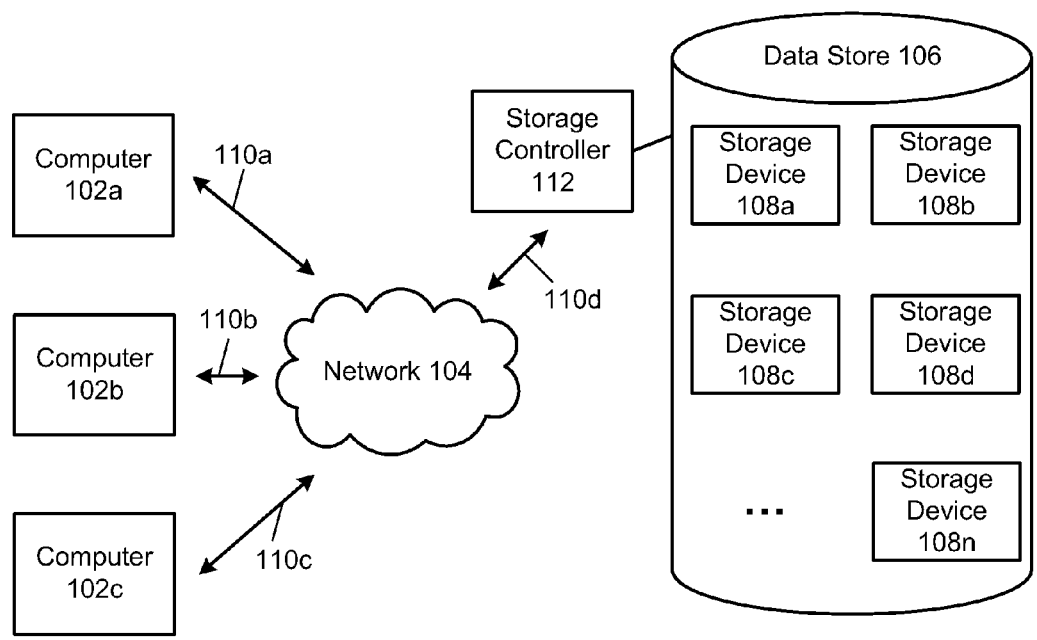
FIG. 1 shows an example computing and data storage system in which a plurality of computing devices access shared storage.

Embodiments relate to techniques for storing data and accessing data stored in computer data storage. Computer data storage refers to components, devices, and/or recording media used to store digital data. A particular computer data storage implementation may be accessed by a single computer or may be shared by multiple computers. For example, FIG. 1 shows a computing and data storage system 100 in which a plurality of computing devices 102a-102c access shared storage shown as a data store 106. As shown in FIG. 1, the system 100 includes computers 102a-102c, at least one communication network 104, a storage controller 112, and the data store 106. Data store 106 includes a plurality of storage units referred to as storage devices 108a-108n. In the example of FIG. 1, computers 102a-102c share data store 106, including being enabled to store data in, and to access data stored in storage devices 108a-108n of data store 106 through network 104.

Although three computers 102a-102c are shown in FIG. 1, any number of computers may be coupled to network 104 to share data store 106, including hundreds, thousands, or even further numbers of computers. The computers may include any type of computing device that stores data to a shared storage location. Examples of computers 102a-102c include stationary and mobile computing devices. For example, each of computers 102a-102c may be a desktop computer (e.g., a personal computer (PC)), a mobile computer (e.g., a personal digital assistant (PDA), a laptop computer, a notebook computer, a smart phone, etc.), or other type of computing device. An example computer is described in more detail below with reference to FIG. 10.

Each of computers 102a-102c is shown in FIG. 1 as communicating with storage controller 112 and data store 106 through network 104 and a corresponding communication link. For example, as shown in FIG. 1, computer 102a is communicatively coupled with network 104 through a communication link 110a, computer 102b is communicatively coupled with network 104 through a communication link 110b, and computer 102c is communicatively coupled with network 104 through a communication link 110c. Storage controller 112 is shown communicatively coupled with network 104 through a communication link 110d. Network 104 may be a LAN (local area network), WAN (wide area network), or combination of networks, such as the Internet. The communication links 110a-110d may include any type or combination of communication links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc.

Data store 106 may include storage devices 108a-108n in any configuration, including as an array. Although storage devices 108a-108n are shown in FIG. 1, any number of storage devices may be included in data store 106 to store data, including hundreds, thousands, or even further numbers of storage devices.

The storage devices 180a-108n store data and can include any type of storage device. The storage controller 112 enforces the conventions established by the shared storage system and ensures that the computers 102a-102c access the storage devices 108a-108n in a manner that is consistent with the processes described herein. In some embodiments, the environment includes more than one storage controller 112 handling operations between computers 102a-102c and the storage devices 108a-108n. The network 104 connects the computers 102a-102c to the storage controller 112, and can include any type of network as well as multiple redundant networks, additional network hardware (e.g., switches and routers), and so forth.

Figure 2:
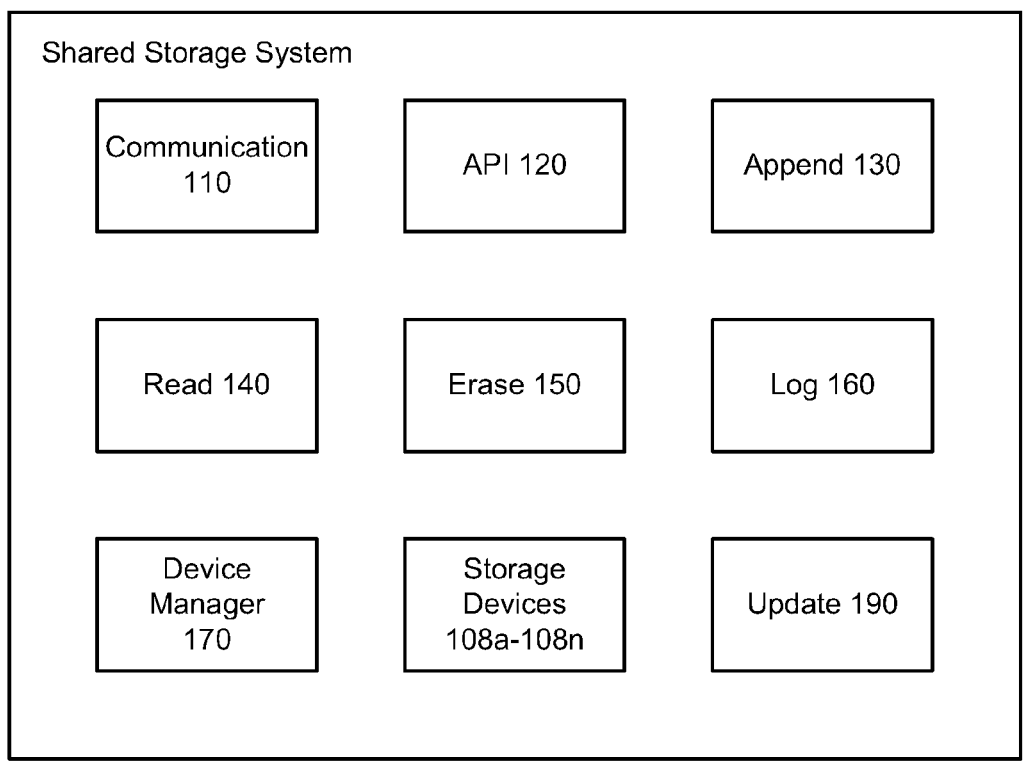
FIG. 2 is a block diagram that illustrates components of an implementation of a shared storage system.

FIG. 2 is a block diagram that illustrates components of a shared storage system, such as may be implemented using the data store 106. The shared storage system includes a communication component 110, an API (application programming interface) component 120, an append component 130, a read component 140, an erase component 150, a log component 160, a device manager component 170, one or more storage devices 108a-108n, and an update component 190.

The communication component 110 sends and receives communications over a network (e.g., the network 104) between the shared storage system and one or more computers (e.g., the computers 102a-102c) that store data with the shared storage system. The communication component 110 may include network hardware, such as a network interface card (NIC), and a network stack that provides common protocols, such as TCP/IP and UDP. The hardware may include redundant NICs for communicating with computers along multiple communication channels in case one channel fails and/or for increased efficiency.

The API component 120 provides an application interface that computers can invoke over the network using a predefined protocol. The API component 120 provides operations including append page, read page, and erase page, that computers can use to store and read data from the shared storage system. The API component 120 may provide other common application interfaces including a web service interface or an administrative interface for an administrator to maintain the shared storage system.

The append component 130 handles append operation requests received from computers. The append component 130 receives an append request, retrieves the next page frame location, stores data from the append request to the next page frame location, and increments the next page frame location. If the operation completes successfully, the append component responds to the request by providing the address at which the append component 130 stored the page. The append component may also provide the result of the append operation to the log component 160 to store as a record of the operation.

The read component 140 handles read operation requests received from computers. A computer can read a page of stored data by providing the address of the stored data through the API component 120 to the read component 140. The read component 140 locates the requested page frame, reads the data from the page frame, and composes a response to the requesting computer containing the requested data.

The erase component 150 handles erase operation requests received from computers. A computer cannot modify pages when the storage is based on flash memory devices other than by erasing a whole block that is typically comprised of page frames (e.g., NAND devices often only allow erasing in blocks of ~64 page frames). The computer may erase a block when the storage device is full or when the computer has a reason for updating a page without writing a new page. In some embodiments, the shared storage system handles erasing blocks when available storage is low and does not externally expose the erase component 150. Since tracking live data with fine granularity can be costly, the erase component 150 may wait until it can erase large, contiguous regions of blocks (and often the whole chip) at once.

The log component 160 stores a log of each successful append operation so that computers can verify whether a computer has already written data. In an implementation, and as described further herein, the log is a totally ordered, durable shared log.

The device manager component 170 manages the storage devices 108a-108n associated with the system. The device manager component 170 may route requests received from the other components to an appropriate storage device based on a segment identifier or other information received in an operation request. The device manager component 170 receives notifications when storage devices are added to and removed from the system and takes steps to expose the storage devices for use by computers accessing the shared storage system. The storage controller 112 may be implemented within the device manager component 170, in an implementation.

The storage devices 108a-108n may include one or more flash memory chips, solid state disks, magnetic disks, optical disks, disk arrays, SANs (storage area networks), or combinations of storage device types. The storage devices 180 are typically persistent and thus store data across power cycles.

The update component 190 provides updates about data written to the storage devices 108a-108n to interested computers. The interested computers may include all of the computers, in which case the update component 190 may broadcast the data or summary information about the data (e.g., the address to which the data was written). In some embodiments, the caller computer specifies in an append request whether the data to be appended is to be broadcast and if so to which other computers. For example, the request may include a multicast address or list of computers that will receive updates about the written data.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a LAN, a WAN, a point-to-point dial-up connection, a cell phone network, and so on. An example computing device is described in more detail below with reference to FIG. 10.

Data may be stored in data store 106 in various ways. For instance, in one current technique for storing data, multipage sets of data may be stored in data store 106 in the form of stripes. A stripe is a multipage set of data that may be stored in storage in a single operation, where each data page is written to a different storage device. Furthermore, a data stripe may be read from storage in a single operation. Each page of the multipage set of data is stored in a corresponding storage device, to form a stripe of the data across the storage devices. Each storage device may have multiple slots for storing data pages, including hundreds, thousands, millions, or even greater numbers of data pages, and thus may include pages from various numbers of stripes. A set of storage devices of data store 106 that is used to store a stripe may be referred to as a stripeset. A stripeset may include any number of storage devices to store a corresponding number of pages of data for each stripe, including hundreds, thousands, or even greater numbers of storage devices. The number of storage devices included in a stripeset, corresponding to the maximum number of pages for a set of data that may be stored in the stripeset, may be referred to as the rank of the stripeset.

Figure 3:
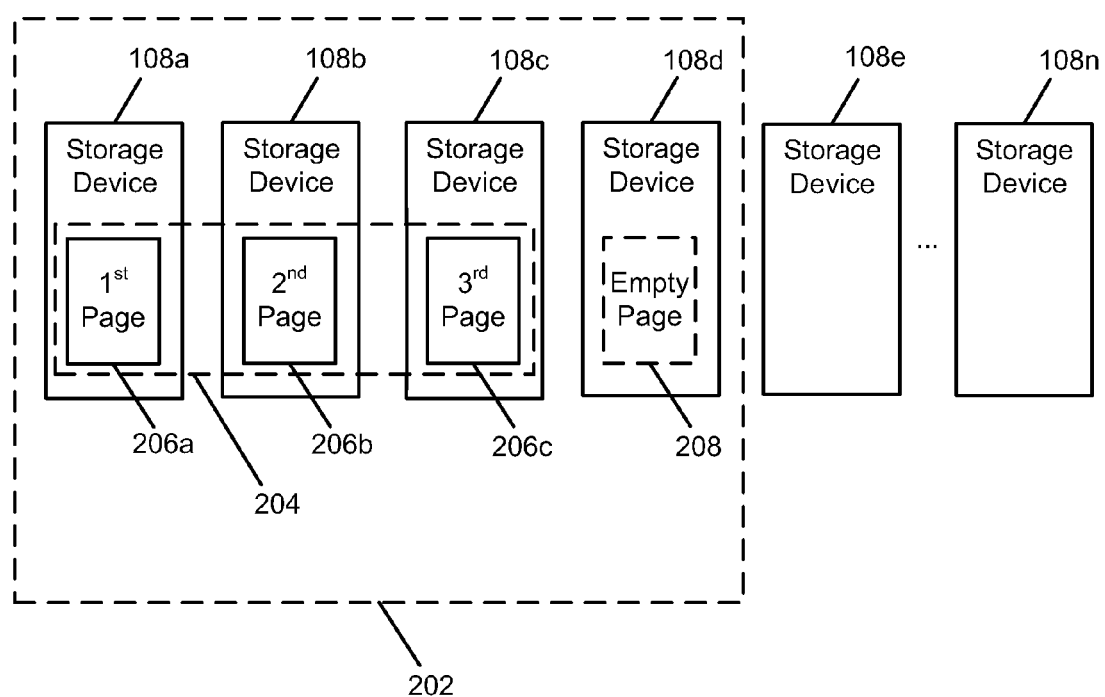
FIG. 3 shows example storage devices of a data store that store data in the form of data stripes.

For example, FIG. 3 shows storage devices 108a-108n of data store 106 storing data in the form of a stripe. As shown in FIG. 3, a first stripe 204 representing data that includes three data pages 206a-206c is stored in data store 106. In FIG. 3, storage devices 108a-108d are currently a portion of data store 106 allocated for storing data in the form of stripes, and thus form a stripeset 202. Because in the current example, stripeset 202 includes four storage devices 108a-108d, stripes including four or less pages of data may be stored in stripeset 202. Storage devices 108e-108n are not included in stripeset 202.

As shown in FIG. 3, stripeset 202 stores first stripe 204. First page 206a of first stripe 204 is stored in storage device 108a, second page 206b of first stripe 204 is stored in storage device 108b, and third page 206c of first stripe 204 is stored in storage device 108c. Because first stripe 204 includes three data pages, no data of first stripe 204 is stored in fourth storage device 108d of stripeset 202, and an empty page 208 is indicated in a first page slot of storage device 108d corresponding to first stripe 204.

Stripesets that store data in the form of stripes enable relatively high performance and high availability to stored data in data store 106. Furthermore, stripesets enable greater data availability storing data across multiple storage devices rather than a single storage device in which a single point of failure may lead to loss of all stored data. If one of storage devices 108a-108d of stripeset 202 fails, the data of the failing storage device may be recovered according to an error correction technique, depending on the particular implementation.

As described further herein, clients may be provided with a totally ordered, durable shared log. Shared storage such as the data store 106 is used and can be directly accessed by clients such as the computers 102a-102c over a network such as the network 104. Append-log operations are made atomic in the face of failures by committing provisional append ordering information onto a log. Read-log operations may also be used to read data at particular offsets or addresses in the data store 106. Durability may be performed through replication and transparently to clients such as the computers 102a-102c. Two implementations, referred to herein as "protocol variants", are described.

In an implementation, the data store 106 may act as a shared log that is accessible by the computers 102a-102c. The log may comprise multiple flash packages, referred to as segments. Each log record is a multi-page stripe, where each page of a stripe is written to a different segment. The fault-tolerant protocol variants described herein append stripes to the log, such that stripes are totally ordered in the log and each stripe is written atomically (i.e., all-or-nothing). An atomic operation refers to a set of operations that can be combined so that they appear to the rest of the system to be a single operation with only two possible outcomes: success or failure. The protocol variants can be used in any system that would benefit from a reliable shared log.

The shared storage system (e.g., comprised within the data store 106) provides an API for applications running on computers (such as computers 102a-102c) to invoke to interact with the system. The API uses a logical abstraction for a segment (i.e., a large unit of physical storage). For example, a segment could represent a flash chip, a part of a flash chip, or a group of two or more flash chips. Each segment has a segment identifier for distinguishing the segment from other segments. For example, the segment identifier may correspond to a flash chip's network address. Each API operation receives a segment identifier as an input parameter. Depending on the implementation, the API may include operations to append a page to a segment and return the appended page's address, read a page at a given address, get the last populated page of a segment, and/or erase a segment. For example, in some implementations, an append operation may not be used or required. In some implementations, a seal operation may not be used or required, where the seal operation accepts a parameter value (e.g., an integer) and seals operations which are tagged by the specified value. The storage controller 112, for example, may implement the functionalities described herein using a variety of techniques.

More particularly, a persistent, reliable append-able log is provided, e.g., within the data store 106. The log provides clients (e.g., computers 102a-102c) with a log-append(entry) interface. An entry has a fixed size, which fits in one disk page in an implementation or within a single stripe, for example, depending on the implementation as described further herein. The requesting clients are supplied with a consistent total ordering of entries which are persistently appended to the log. As used herein, "disk" means a persistent storage medium such as a magnetic hard drive, a solid state disk, a file of a solid state disk, or an individual flash chip memory device or flash chip. A physical disk may be partitioned into logical segments, which will be used cyclically as the basic units of storage (i.e., as the segments).

A read command may be used to read a single page of data starting from an address that is page aligned. Data is returned on success, and NULL is returned on failure. A seal command marks the addresses belonging to the current epoch as read-only. When a segment has been sealed for a particular epoch value, segment operations using that epoch value, other than read operations, are rejected for that segment.

In an implementation, N segments are used to store log entries, where N may be any integer. A write command or API may be used to write data to an address of a segment. The address is a page boundary, from zero to the segment size, and the data written may be one page in size, for example. The write command checks if the epoch (i.e., version) of the segment is current (not sealed), and returns positive acknowledgement on success, and an error value on failure. As an alternative to random access writes, an append command may be used that writes disk pages sequentially. The append command may allocate the next available page offset on disk and write the data to it. The append command returns the offset allocated at which data was written, or an error value on failure.

In an implementation, segments may have a state variable called a class which may serve the role of an epoch. A class is a small integer which is used to describe the type of the last page that was stored in the segment. Each write or append operation and each segment has a class. When a segment is initialized (i.e., erased), it has the lowest class (i.e., zero). Subsequently, a write or append succeeds if it has the segment's class or a higher one. The last page write to the segment sets its class. Consequently, pages are written to segments in monotonically increasing order of classes. To seal a particular segment from further updates of a class, a page of a higher class may be written or appended to the segment.

In an implementation, an auxiliary manager may be provided to the computers 102a-102c (e.g., within the computers 102a-102c or the storage controller 112) that supplies service to a shared array E[ ]. The k'th entry E[k] stores information about the epoch-k configuration. It is initially empty, and may be set once in an atomic compare-and-swap operation. It may also be queried, and in response, it returns its value. The auxiliary is implemented reliably in order to facilitate reconfigurations. If it is unavailable, then the reconfiguration protocol, described further herein, will block.

Each protocol variant comprises two phases that serve similar purposes. One phase sets a provisional unique append order, and another phase commits it. Disks serve not only to store the log, but also to persistently store information about the total ordering of log entries. Setting a provisional unique ordering may differ among protocol variants. For example, in one variant, log entries (i.e., stripes) are totally ordered by the order of pages on one designated storage segment, and in another variant, they are totally ordered by a leader process. Thus, append-stripe operations are made atomic in the face of failures by the variants. In the variants, provisional append ordering information is committed onto a log.

The variants employ an array of segments called a stripeset as described above. Data is appended to the log in stripes. The protocol variants ensure that all compute nodes (e.g., computers 102a-102c) have the same view of the total order of log stripes, despite failures and recoveries of segments and compute nodes and despite lost messages.

In a first protocol variant, the configuration of each epoch comprises the set of segments which clients (potentially numerous) access directly via a communication link. Note that in this architecture, no single process is a bottleneck in the path of normal operation. The segment set comprises an edge segment, a set of log segments, and a set of N end-write segments. Writing to the segments is done through an append API.

Figure 4:
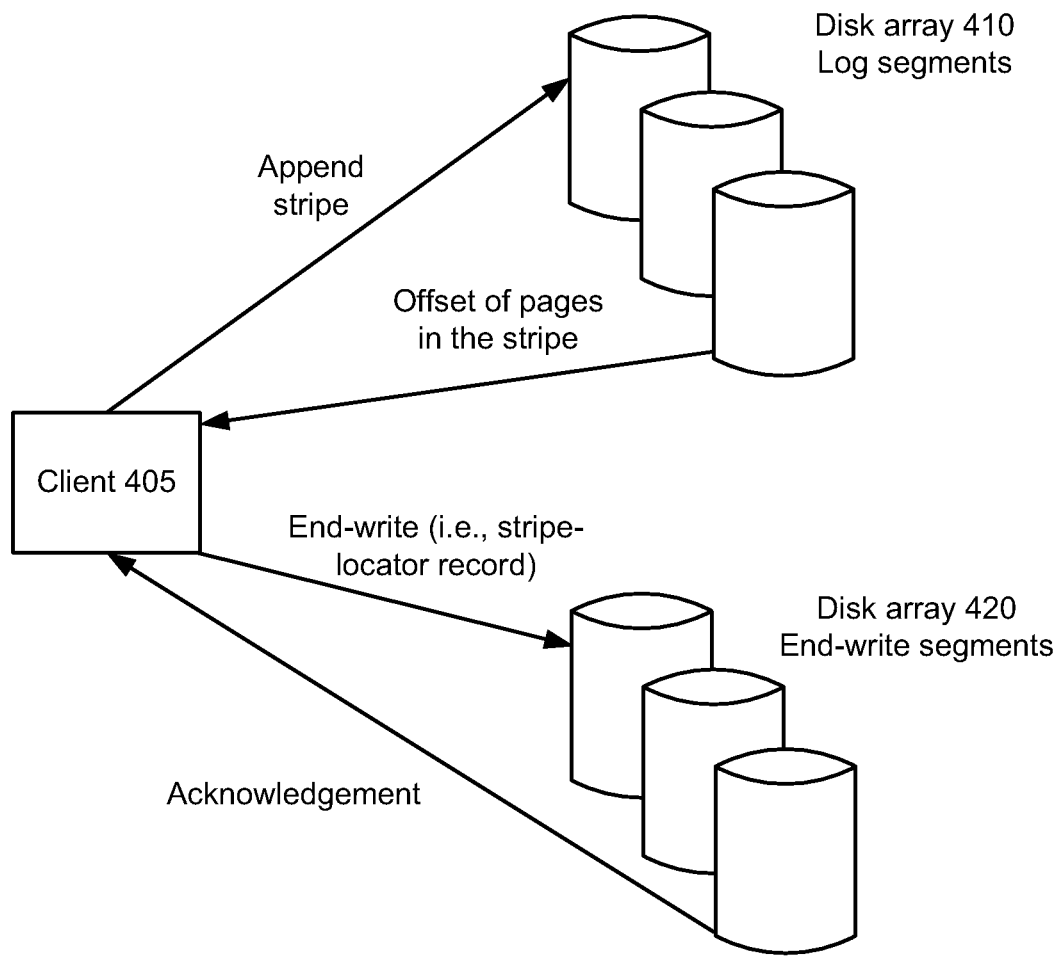
FIG. 4 is a block diagram of an example steady state interaction pattern between a client, a disk array that stores log segments, and a disk array that stores end-write segments in accordance with a first protocol variant.

FIG. 4 is a block diagram of a steady state interaction pattern between a client 405, a disk array 410 that stores log segments, and a disk array 420 that stores end-write segments in accordance with the first protocol variant. In this example protocol variant, the first segment of the log stripeset, called the edge, determines the offset of the stripe in the log order. To preserve the ordering information and to ensure append-stripe operations are atomic, an end-write record is appended to another log, the end-write log. An end-write record describes the completion of an append-stripe operation. It contains the offsets within their respective segments of all of the pages in a stripe. It can therefore be used for determining the order of log records (via the offset of a stripe's page stored in the edge) and for locating pages within a log record's stripe. The end-write log is fault tolerant. Hence, it too is striped across multiple segments. In this first variant, disks support two functionalities, appending and sealing from further appends.

Figure 5:
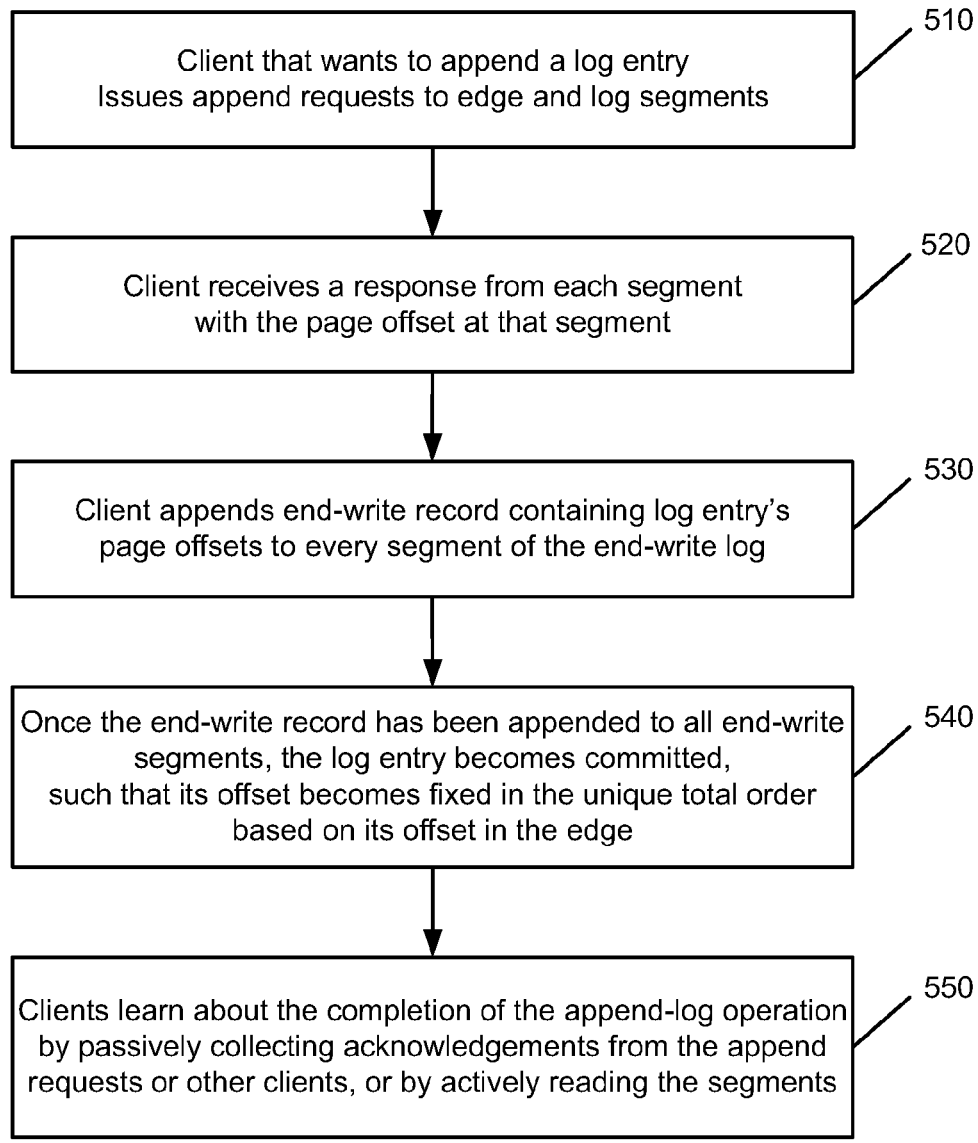
FIG. 5 is an operational flow of an implementation of a log-append method during fault-free periods that may be used with the first protocol variant.

FIG. 5 is an operational flow of an implementation of a log-append(entry) client method 500 during fault-free periods. A steady state protocol performed by clients is as follows. During normal fault-free periods, a client that wishes to append a log entry S to the total order issues append(current-epoch, S) requests to the edge and to all the log segments, at 510. The client receives a response at 520 from each segment with the page offset at that segment.

At 530, the client appends an end-write record containing log entry S's page offsets to every segment of the end-write log. Once the end-write record has been appended to all end-write segments, at 540, log entry S becomes committed, i.e., its offset becomes fixed in the unique total order based on its offset in the edge. With a unique total order, all participants in the protocol agree on what the total order is. For example, if one client thought the order was A,B,C, but another client thought the order was B,A,C, or simply A, C (and didn't know about B), then the records are totally ordered but there is not a unique total order. At 550, other clients learn about the completion of the append-log operation either by passively collecting acknowledgements from the append requests or other clients, or by actively reading the segments.

It is noted that other clients may read the edge and log segments in order to help a failing client in committing entries. This can be done by re-issuing an end-write record append request. Additionally, instead of writing the same page to all segments, striping with error correction (e.g., ECC) may be used. In order to alleviate any individual disk from becoming a bottleneck, different entries may be written to different subsets of the disk array, using some fixed mapping of offsets to segment subsets, as long as one page of the entry is stored in the edge segment.

The fault-free protocol described constitutes a technique for an initial configuration. A failure of any segment of a configuration is handled by moving to a new configuration. Likewise, when a segment is filled up, a new segment set is used via reconfiguration. Reconfiguration is guaranteed to facilitate progress provided that the following conditions hold (otherwise, it is blocked): (1) the new configuration is predetermined and is known to all clients, (2) there is no additional failure (or segment filling) in the new configuration until after it is fully activated, and (3) one end-write segment in the current configuration is accessible.

Furthermore, in order for data loss to be prevented, the current configuration persists with sufficiently many replicas to recover all committed log entries. As a practical note, a background recovery process that restores the contents of a failed segment may be initiated in order to bring the resilience back up after a failure.

Figure 6:
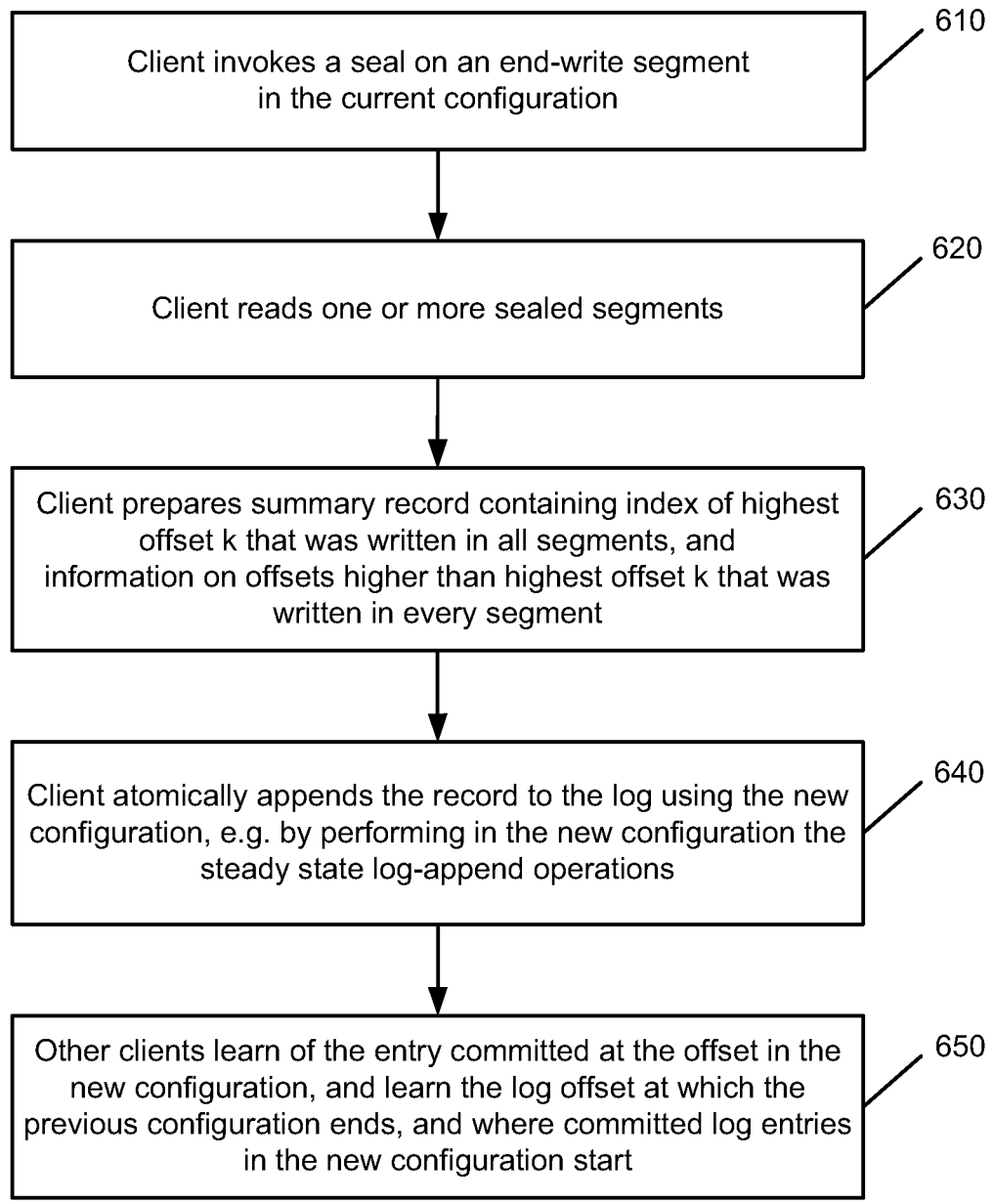
FIG. 6 is an operational flow of an implementation of a reconfiguration method that may be used with the first protocol variant.

FIG. 6 is an operational flow of an implementation of a reconfiguration method 600. An auxiliary-free version is described for brevity. In this version, the next configuration is predetermined, and activating it is assumed to succeed using failure thresholds.

A client attempting to start the new configuration is created with knowledge of the set of segments in the new configuration. In phase 1, at 610, the client invokes seal(e) on an end-write segment in the current configuration. To allow gathering information from more than one sealed segment, additional seals may be invoked. At 620, the client reads one or more sealed segments. For each offset O, it learns one of the following: (i) it was written to all end-write segments, (ii) it was written in every end-write segment accessed in this phase, or (iii) it will remain empty in one of the end-write segments (because it is currently empty and the segment is sealed).

Because segments may be large, optimizations may be used depending on the implementation. The initiating client may know a prefix of the log which has been appended already, and there is no need to read it. Furthermore, the storage controller may provide an upper bound on the highest potentially-written offset. The initiating client reads blocks only up to that bound.

In phase 2, at 630, the client prepares a summary record B containing (1) the index of the highest offset k, such that the prefix of commands up to k have status (i) (from 620), and (2) information on all offsets (higher than k) whose status is (ii) (from 620). At 640, the client atomically appends the record B to the log using the new configuration, e.g. by performing in the new configuration the operations of the steady state log-append(B) operation described with respect to FIG. 5. This operation succeeds because there are no additional failures in the new configuration. At 650, clients learn the entry committed at the offset in the new configuration. They can read the entry B stored in it to learn the log offset at which the previous configuration ends, and where committed log entries in the new configuration start.

In a second protocol variant, the configuration of each epoch comprises the set of N segments and a designated leader process, running on a computer. In addition, an auxiliary manager may facilitate reconfiguration. In such a protocol variant, a leader process may be used, which runs on a designated computer, to set a unique order of log records. A computer first reserves a unique offset in the log by contacting the leader. The record of the provisional offset in the log is included in the stripe contents. The computer tries to write the stripe onto the stripeset. If it succeeds in writing all the stripe pages, then the record is permanently stored at the specified offset. In this protocol variant, disks support the sealing functionality.

Figure 7:
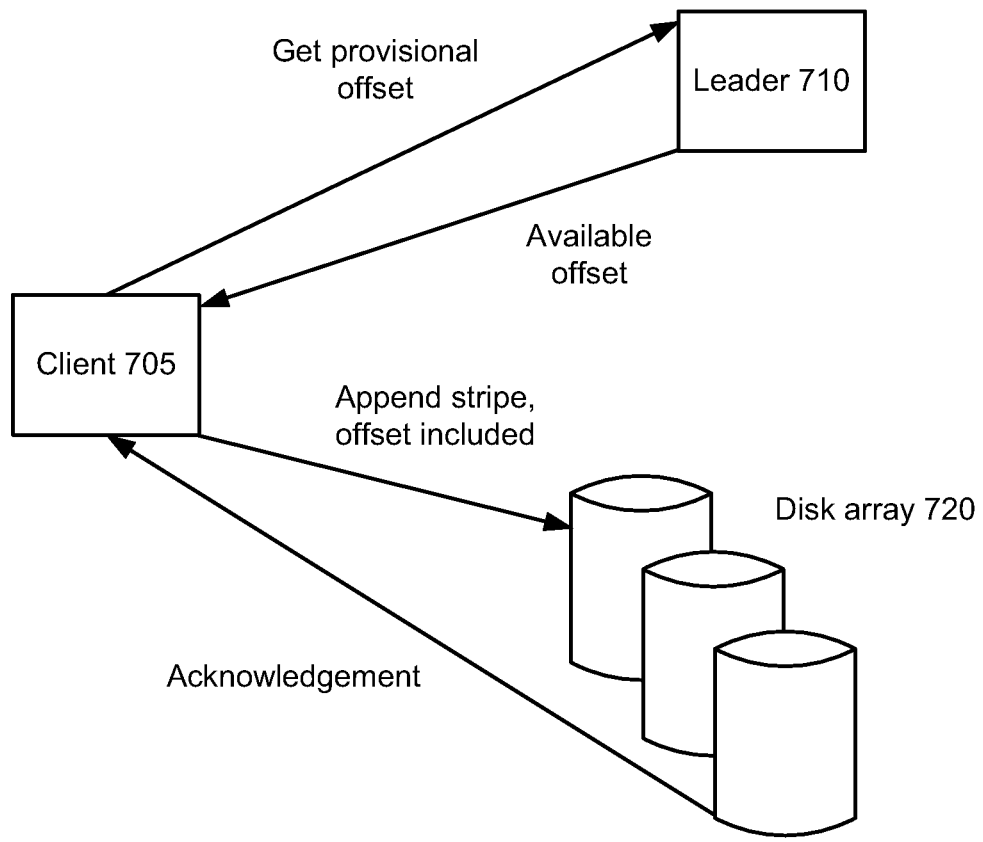
FIG. 7 is a block diagram of an example steady state interaction pattern between a client, a leader, and a disk array in accordance with a second protocol variant.
Figure 8:
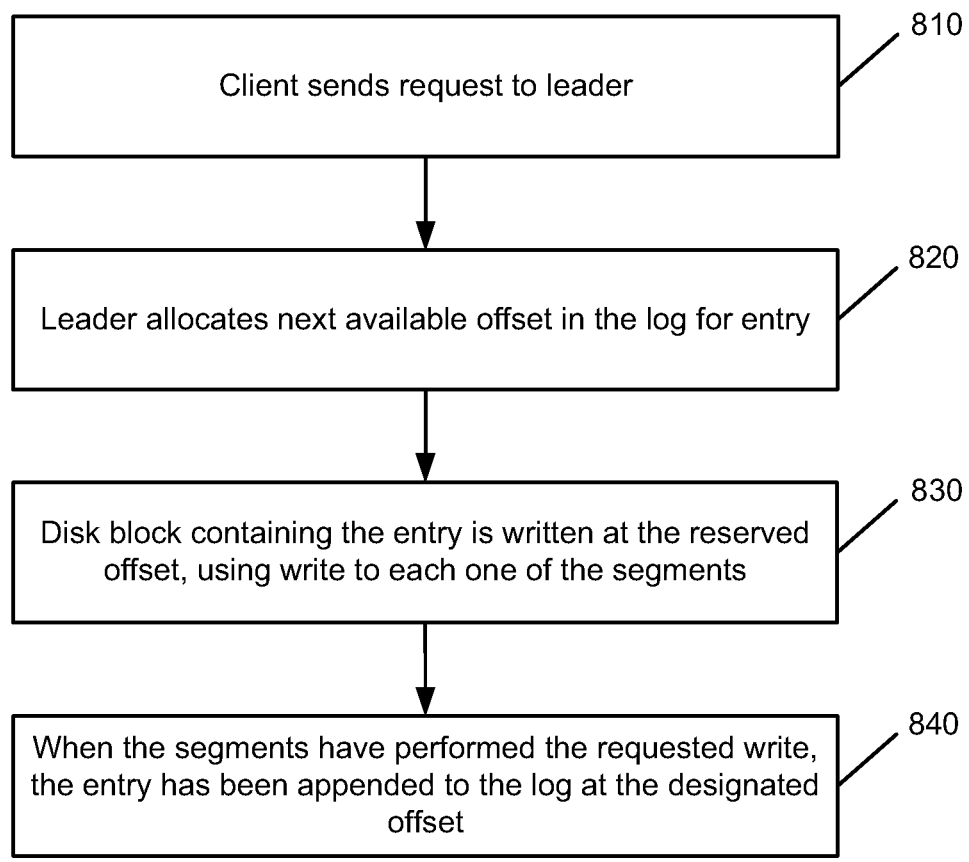
FIG. 8 is an operational flow of an implementation of a log-append method during fault-free periods that may be used with the second protocol variant.

FIG. 7 is a block diagram of a steady state interaction pattern between a client 705, a leader 710, and a disk array 720 in accordance with the second protocol variant. FIG. 8 is an operational flow of an implementation of a log-append (entry) client method 800 during fault-free periods. At 810, the client 705 makes the request known to the leader 710. At 820, the leader 710 allocates the next available offset in the log for the entry. At 830, a disk block D that contains the entry is written at the offset reserved in the second step, using write(current-epoch, reserved-offset, D), to each one of the N segments. When all N segments have performed the requested write, the entry has been appended to the log at the designated offset, at 840.

In an implementation, a client sends a reservation request using point-to-point communication directly to the leader, and the leader responds directly to it. Then the client issues the write request to the segments and collects acknowledgements. The client then broadcasts the committed page to all other clients. With this implementation, in the unlikely event that a client fails between getting the provisional offset and appending the stripe, it may leave 'holes' in the dense sequence of offsets. These holes can be resolved using a reconfiguration decision. In another implementation, a client broadcasts the entry request to the leader and to the other clients. The leader may accumulate several client requests, and respond in one multicast/broadcast message to all the clients. The client that initiated a request issues a write of the entry to each segment at the reserved offset. Other clients may help by issuing the same write request to segments. The segment acknowledgements can be broadcast to all clients, or clients may forward segment acknowledgements to other clients. Clients may learn about the completion of the append-log operation either by passively collecting acknowledgements from the N writes, or by actively reading the segments.

It is noted that instead of writing the same page D to all segments, striping with error correction (e.g., ECC) may be used. For example, if N=3 segments are used, then a client may write two pages of data plus a page of parity bits. Moreover, in order to alleviate any individual disk from becoming a bottleneck, partial stripes may be written to different subsets of the array across different writes. This may be implemented with a fixed load-balanced allocation rule, or the leader could play an active role in allocating segments to each offset. The latter uses some additional processing to identify the set of page locations for each stripe. For example, in response to a client request, the leader could reply with an offset for the stripe plus the locations on each segment where the pages are to be stored. This offset and set of locations could be included in the header of each page, so that given any page of a stripe, all of the other pages of the stripe can be found. Known techniques, such as differential RAID, may be used so that parity is distributed among the segments, in order to promote reliability.

In a variation of the second protocol variant, after obtaining a provisional offset from the leader 710, the client 705 includes that provisional offset in a header of each stripe page. The client 705 then writes the stripe pages to any convenient locations in the stripeset. As an example, the client 705 could do this by appending each page of the stripe to a segment in the stripeset. Thus, a client that subsequently reads the stripe uses the offset in the header of each page to determine the offset of the stripe in the sequence.

In an implementation, for variable-length stripes, there needs to be enough information to identify all of the pages of the stripe. In an implementation of the first protocol variant, the end-write record contains pointers to all of the pages of the stripe. In an implementation of the second protocol variant, all pages are stored at the same offset. If the stripe contains fewer pages than the number of segments, then page slots that are not part of the stripe are identified as such. For example, if the maximum stripe size is four pages and a stripe of three pages is stored, then the empty page slot is tagged so that readers recognize its contents are not part of the stripe. In one implementation, the page slot has a tag indicating that it is empty. In another implementation, each page has a header with a cycle number indicating the number of times it was written. Thus, the empty page slot's cycle number is one less than the full page slots' cycle number. In yet another implementation, a page header contains a unique identifier for the stripe and a count of the number of pages in the stripe. This implementation would work well with the variation of the second protocol variant, since a page header is already present to store the provisional offset.

Clients may read from the stripeset a stripe corresponding to a certain logical offset in the log total order. In the first protocol variant, a client first obtains an end-write record, which contains the page offsets of the stripe pages. In one implementation, a client may obtain this when the end-write record is broadcast by another client, such as the client that issued the corresponding stripe append. In another implementation, a client may obtain only the offsets of the end-write record pages, for example, when devices broadcast acknowledgements of having stored the end-write pages. In that case, a client first reads the pages corresponding to the end-write record. This record contains the page offsets of the stripe pages, which the client uses to access the log stripeset directly. In yet another implementation, a client may actively read the end-write segment-set in any order to obtain the end-write record describing the stripe page offsets. Then, as in the previous method, the client uses the end-write record to locate the pages of the stripe in the stripeset.

In the second protocol variant, clients locate the pages of a stripe using information from the stripeset. In one implementation, the stripe pages corresponding to a particular stripe are stored at a disk offset corresponding to the stripe offset in the log total order. In this implementation, a client reads from each segment the page at the offset corresponding to the log offset it wishes to obtain. In another implementation, stripe pages may be stored at different offsets on stripe segments, and a header stored in or with the stripe pages describes the offset in the log sequence order. A client that subsequently reads the stripe uses the offset in the header of each page to determine the offset of the stripe in the log sequence. If stripes are of variable length, then the header also includes the number of pages in the stripe or the identities of the segments where the pages of the stripe are stored.

The fault-free protocol described with respect to FIG. 8 is for an initial configuration. A failure of any component of a configuration (i.e., a segment or leader) is handled by moving to another configuration. Likewise, when a segment is filled up, another configuration is used, e.g., by adding a new segment to replace the full one. Reconfiguration is guaranteed to facilitate progress provided that the following conditions hold: (1) the auxiliary is operational and accessible, (2) one segment in the current configuration is accessible, and (3) there exists an attempted next configuration whose components (i.e., segments and leader) are accessible.

Furthermore, to prevent data loss, the current configuration persists with sufficiently many replicas to recover the committed transactions. In an implementation, a background recovery process may be initiated as soon as faults are detected, in order to recover the content of the failed component(s) and thereby bring the resilience back up to the level it had before the failure.

Figure 9:
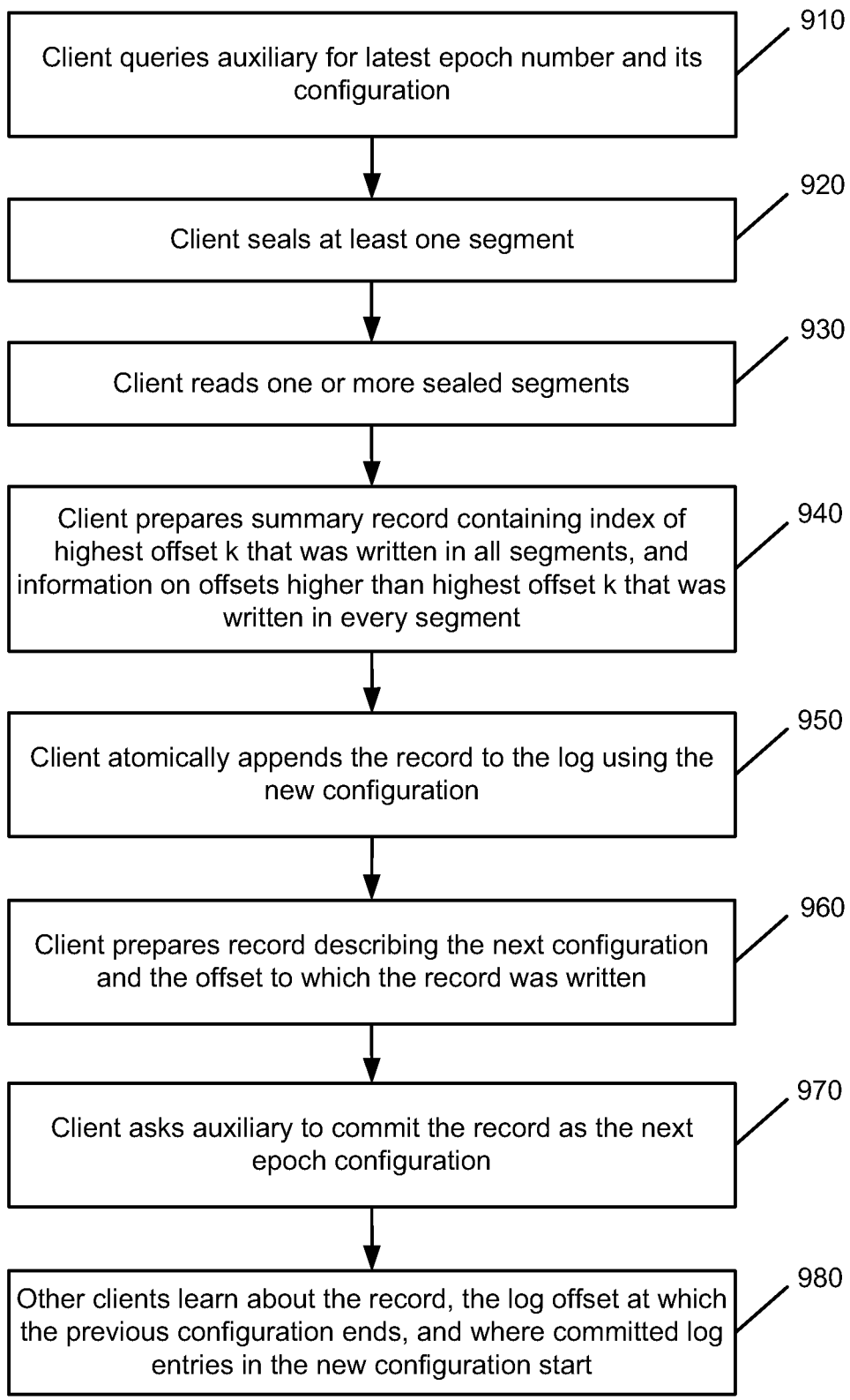
FIG. 9 is an operational flow of an implementation of a reconfiguration method that may be used with the second first protocol variant.

FIG. 9 is an operational flow of an implementation of a reconfiguration method 900. At 910, in phase 0, an initiating client queries the auxiliary manager about the latest epoch number e and its corresponding configuration E[e]. Thus, in phase 0, an initiating client preparing for reconfiguration learns from the auxiliary manager the last active configuration e.

At 920, in phase 1, the client invokes seal(e) on at least one segment. Though one seal is sufficient for blocking the configuration from committing new entries, additional seals to other segments may improve efficiency, as they allow the client to collect more information from the current configuration. At 930, the client reads one or more sealed segments. For each offset O, the client learns one of the following: (i) it was written in all segments, (ii) it was written in every segment accessed in this phase, or (iii) it will remain empty in one of the segments (because the segment is sealed). Case (i) can arise only if all segments are available, i.e., if the reconfiguration was triggered by a segment filling up or a leader failing. At 940, the client prepares a summary record B containing (1) the index of the highest offset k, such that the prefix of commands up to k have status (i), and (2) information on all offsets higher than k whose status is (ii) above.

Thus, in phase 1, the client suspends the current epoch from further appends by invoking seal(e) on the segments. A segment is read only after it has been sealed. As a practical note, since segments may be quite large, optimizations may be warranted. The initiating client may know a prefix of the log which has been appended already, and there is no need to read it. Furthermore, the storage controller may provide an upper bound on the highest potentially-written offset. The initiating client needs to read blocks only up to that bound.

At 950, in phase 2, the client atomically appends the record B to the log using the new configuration, by performing in the new configuration the steps of the steady state log-append(B) operation described with respect to FIG. 8. In phase 2, assume that stripes (i.e., log records) that were successfully appended in the current configuration persist, and meta-data is transferred that determines which log-append operations succeeded. Later, the client initiates lazy replication of the epoch e data, to prevent loss of data in case of additional segment failures.

At 960, in phase 3, the client prepares a record describing both the next configuration and the offset to which the record B was written in phase 2. At 970, the client asks the auxiliary manager to commit this record as the next epoch configuration, by invoking compare-and-swap on E[e+1]. Only one client may succeed in this operation, and any further attempts fail. After a successful reconfiguration, clients may resume handling append-log requests within epoch e+1. At 980, clients learn about the record B, the log offset at which the previous configuration ends, and where committed log entries in the new configuration start.

Thus, phase 3 utilizes the auxiliary in order to form a decision on the next configuration. When a new configuration C completes a transfer of all information on past appended entries, it atomically sets the value of E[e+1] to the new configuration C.

Figure 10:
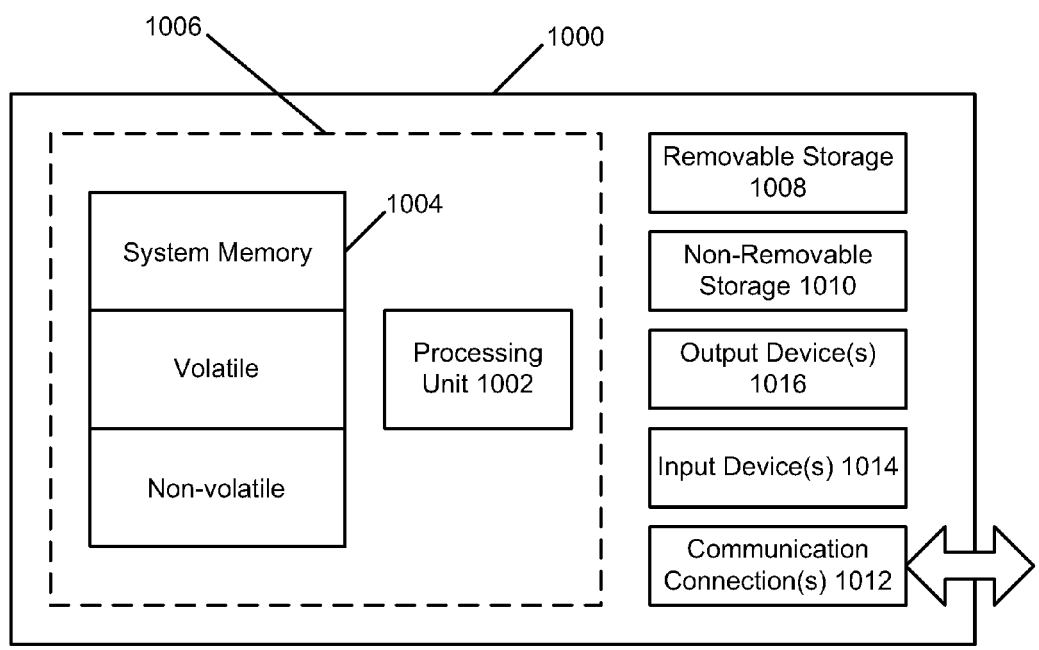
FIG. 10 shows an exemplary computing environment.

FIG. 10 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, programmable consumer electronics, digital cameras, network PCs, minicomputers, mainframe computers, embedded systems, distributed computing environments that include any of the above systems or devices, and the like. The computer systems may be cell phones, personal digital assistants, smart phones, personal computers, programmable consumer electronics, digital cameras, and so on.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as RAM), non-volatile (such as ROM, flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by device 1000 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communications connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for sharing a data store, comprising:
issuing an append request to a leader computing device by a computing device, wherein the append request comprises a request to append a log entry to a totally ordered log within the data store;
receiving a response at the computing device from the leader computing device, wherein the response comprises information pertaining to the next available offset in the log for the log entry;
writing the entry at the offset to each of a plurality of storage segments within the data store;
receiving, at the computing device, acknowledgements pertaining to the writing from the storage segments;
preparing a summary record containing an index of the highest offset that was written in all the storage segments and information on offsets higher than highest offset that was written in every segment; and
atomically appending a record to the log using a new configuration.

2. The method of claim 1, wherein writing the entry comprises striping the entry across the plurality of storage segments.

3. The method of claim 2, further comprising reading a stripe from the plurality of storage segments using an offset corresponding to an offset into the log, wherein the offset corresponds to a stripe offset in a log total order or a log sequence order.

4. The method of claim 1, further comprising performing a reconfiguration by sealing one of the storage segments.

5. The method of claim 4, further comprising preparing a record describing a next configuration and the offset to which the entry was written, and committing the record in the next configuration.

6. The method of claim 1, wherein each of the storage segments comprises a non-volatile memory device.

7. The method of claim 1, wherein each of the storage segments has a class that describes the type of the last page that was stored in the storage segment, and wherein an append operation has a class, and the append operation to a storage segment is successful if the class of the append operation has at least the class of the storage segment or a higher class.

8. A method comprising:
   setting a provisional append order in a log contained in a data store, by a computing device, the log configured to operate as a log-append interface that is accessible by one or more computers for storing data in the data store; and
   committing log entries associated with the provisional append order to a totally ordered log, by the computing device; and
   striping the totally ordered log across a plurality of storage segments, by the computing device,
   wherein an append operation has a class, and further wherein the append operation to a segment is successful if the class of the append operation has at least the class of the segment or a higher class.

9. The method of claim 8, wherein the log comprises a plurality of non-volatile memory devices, and each log entry is a multi-page stripe, and each page of a stripe is written to a different one of the non-volatile memory devices.

10. The method of claim 9, wherein the log entries are provisionally ordered by storing a provisional offset in a header of each page of a stripe.

11. The method of claim 8, further comprising appending data stripes in the log such that the data stripes are totally ordered in the log.

12. The method of claim 8, wherein the total ordering is performed by a leader process.

13. A method for sharing a data store, comprising:
   issuing an append request to a plurality of storage segments by a computing device, wherein the append request comprises a request to append a log entry to a totally ordered log within the data store;
   receiving a response at the computing device from each of the storage segments, wherein each response provides information of a page offset of the associated storage segment;
   appending an end-write record comprising a plurality of page offsets of the log entry to each of the storage segments;
   committing the log entry such that the offset of the log entry becomes fixed in a unique total order of the totally ordered log;
   preparing, by the computing device, a summary record containing an index of the highest offset that was written in all the storage segments and information on offsets higher than highest offset that was written in every segment; and
   atomically appending a record to the log, by the computing device, using a new configuration.

14. The method of claim 13, wherein the totally ordered log is striped across the storage segments.

15. The method of claim 13, further comprising performing a reconfiguration by sealing one of the storage segments.

16. The method of claim 13, wherein each segment has a class, wherein the class is a state variable used to describe the type of the last page that was stored in the segment.

17. The method of claim 16, wherein an append operation has a class, and the append operation to a segment is successful if the class of the append operation has at least the class of the segment or a higher class, further comprising sealing a segment from any update of a class by appending a page of a higher class to the segment.

18. The method of claim 13, wherein the storage segments store the log and persistently store information about the total ordering of log entries.

19. The method of claim 13, wherein the storage segments comprise at least one edge segment, and the unique total order is determined using the edge segment.

20. The method of claim 13, further comprising reading data from a stripe of one of the storage segments by obtaining the end-write record containing the page offsets to each of the storage segments, wherein the stripe corresponds to a particular logical offset in the totally ordered log.

\* \* \* \* \*